US012612723B2

(12) United States Patent (10) Patent No.: US 12,612,723 B2
Kim et al. (45) Date of Patent: Apr. 28, 2026

(54) WASHING MACHINE DRIVING SYSTEM AND A WASHING MACHINE WITH THE SAME

(71) Applicant: LG Electronics Inc., Seoul (KR)

(72) Inventors: Kyeonghwan Kim, Seoul (KR); Seungsuk Oh, Seoul (KR); Hyounguk Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 18/593,062

(22) Filed: Mar. 1, 2024

(65) Prior Publication Data

US 2024/0352644 A1     Oct. 24, 2024

(30) Foreign Application Priority Data

Apr. 20, 2023     (KR) ........................ 10-2023-0051717

(51) Int. Cl.
      *D06F 37/30*          (2020.01)
      *D06F 23/02*          (2006.01)
      *F16H 57/08*          (2006.01)
(52) U.S. Cl.
      CPC ............ *D06F 37/304* (2013.01); *D06F 23/02* (2013.01); *F16H 57/082* (2013.01); *F16H 2057/085* (2013.01)
(58) Field of Classification Search
      CPC .................................................... D06F 37/304
      See application file for complete search history.

(56) References Cited

FOREIGN PATENT DOCUMENTS

| EP | 3556926 B1 | 2/2023 |
|----|------------|--------|
| KR | 10-0210517 | 7/1999 |
| KR | 10-2004-0065839 | 7/2004 |
| KR | 10-1603210 B1 | 3/2016 |
| KR | 10-1639023 B1 | 7/2016 |
| KR | 10-2017-0042220 A | 4/2017 |
| KR | 10-2020-0089604 | 7/2020 |
| KR | 10-2020-0106555 | 9/2020 |
| WO | 2017/061836 A1 | 4/2017 |
| WO | 2023/158062 A1 | 8/2023 |

OTHER PUBLICATIONS

Office Action in Korean Appln. No. 10-2023-0051717, mailed on Jun. 11, 2025, 11 pages (with English translation).
Extended European Search Report in European Appln No. 24164707. 2, mailed on Sep. 9, 2024, 8 pages.

*Primary Examiner* — Jason Y Ko
(74) *Attorney, Agent, or Firm* — Fish & Richardson P.C.

(57) ABSTRACT

A planetary gear assembly includes a gear housing, a carrier including a carrier flange positioned inside the gear housing, and a carrier shaft extending in an axial direction from the carrier flange toward a front side of the gear housing and coupled to a drum shaft, a sun gear including a front end that is coupled to the carrier while spaced apart from a back end of the drum shaft, and a back end that protrudes toward a back side of the gear housing and is coupled to a rotor frame of a motor, a key bolt including a bolt head coupled to the front end of the sun gear and a bolt shaft extending backward along the axial direction and penetrating the sun gear, pinion gears coupled to the carrier flange and tooth-coupled to the sun gear, and a ring gear tooth-coupled to the pinion gears.

20 Claims, 7 Drawing Sheets

WASHING MACHINE DRIVING SYSTEM AND A WASHING MACHINE WITH THE SAME

CROSS-REFERENCE TO RELATED APPLICATION

This application claims priority to and the benefit of Korean Patent Application No. 10-2023-0051717, filed in the Korean Intellectual Property Office, on Apr. 20, 2023.

TECHNICAL FIELD

The present disclosure relates to a washing machine driving system with a planetary gear assembly and a clutch assembly and a washing machine with the same.

BACKGROUND

A washing machine may be driven in two main operating modes with different operating conditions including, for example, a washing mode (which may include a rinsing mode) and a spin-drying mode.

In some examples, in order to perform two main operating modes, the washing machine may include a planetary gear assembly and a clutch assembly, and drive an drum shaft at low speed and high torque with a gear ratio of n:1 (washing mode), or drive the drum shaft at high speed and low torque with a gear ratio of 1:1 (spin-drying mode).

Here, the drum shaft refers to a shaft coupled to a drum to rotate the drum.

In some cases, a deceleration mode may refer to the case of driving the drum shaft at low speed and high torque with a gear ratio of n:1. A direct connection mode may refer to the case of driving the drum shaft at high speed and low torque with a gear ratio of 1:1.

In a normal washing machine, a washing mode (which may include a rinsing mode) is performed by operating the drum shaft at low speed and high torque, and after the washing mode ends, the motor is temporarily stopped, and a draining operation is performed. And, after the draining operation ends, a spin-drying mode starts.

The drum shaft may be operated at high speed and low torque in the spin-drying mode. Therefore, the washing machine driving system may include parts for shifting a rotational force of the motor transmitted to the drum shaft between the washing mode and the spin-drying mode, for example, the planetary gear assembly and the clutch assembly.

For example, a washing machine driving system includes a drum shaft that is installed to pass through a carrier and a sun gear shaft of a planetary gear assembly. Since the diameter of the sun gear accommodating the drum shaft increases in the washing machine driving system, the reduction ratio may be small.

In another example, a washing machine driving system includes a planetary gear assembly and a clutch assembly that are arranged in series on an axis of a drum shaft. In the washing machine driving system, the volume of the drum may be reduced due to the planetary gear assembly and the clutch assembly that are arranged in series on the shaft of the drum shaft.

In another example, a washing machine driving system may include the sun gear of the planetary gear assembly provided separately from the drum shaft of the drum assembly. The washing machine driving system may cause an inconvenience in fastening the drum shaft and the sun gear inside the drum assembly.

SUMMARY

The present disclosure describes a washing machine driving system in which a drum shaft and the motor are separated, a planetary gear assembly is placed therebetween, and the axial degree of freedom of the drum shaft is constrained. According to the washing machine driving system, the drum shaft may not separate from a bearing housing on a tub side, and a size of a sun gear may not be affected by a size of an outer diameter of the drum shaft.

The present disclosure further describes a washing machine driving system capable of effectively implementing a high reduction ratio region while having a compact size and using a small motor.

The present disclosure further describes a washing machine driving system capable of securing the volume of the drum to the maximum.

The present disclosure further describes a washing machine driving system capable of securing assembly efficiency.

The present disclosure further describes a washing machine driving system capable of minimizing a space for the arrangement of the planetary gear assembly and the clutch assembly for manipulating it.

The present disclosure further describes a front-loading type washing machine having the above-mentioned washing machine driving system.

According to one aspect of the subject matter described in this application, a washing machine driving system includes a motor comprising a rotor frame and a planetary gear assembly. The planetary gear assembly includes a gear housing and a carrier including (i) a carrier flange disposed inside the gear housing and (ii) a carrier shaft that extends from the carrier flange in an axial direction and protrudes toward a front side of the gear housing, where the carrier shaft is connected to a drum shaft and configured to rotate with the drum shaft. The planetary gear assembly further includes a sun gear having (i) a front end that is rotatably coupled to the carrier and spaced apart from a back end of the drum shaft and (ii) a back end that protrudes toward a back side of the gear housing and is coupled to the rotor frame. The planetary gear assembly further includes a key bolt that couples the sun gear to the gear housing, the key bolt comprising (i) a bolt head coupled to the front end of the sun gear and (ii) a bolt shaft that extends backward along the axial direction and passes through the sun gear. The planetary gear assembly further includes a plurality of pinion gears coupled to the carrier flange and tooth-coupled to the sun gear, and a ring gear that is tooth-coupled to the plurality of pinion gears.

Implementations according to this aspect can include one or more of the following features. For example, in some implementations, a carrier, which is unrelated to the reduction ratio of the planetary gear assembly, is coupled to the drum shaft, and the sun gear, which is related to the reduction ratio of the planetary gear assembly, is coupled to the carrier. Therefore, since the sun gear, which is related to the reduction ratio of the planetary gear assembly, can be miniaturized, it is possible to compact the planetary gear assembly, and effectively implement a high reduction ratio region while using a small motor.

The key bolt can further include a coupling protrusion protruding backward from the bolt head along the axial direction, and the sun gear can include a protrusion insertion groove into which the coupling protrusion of the key bolt is inserted.

Therefore, it can be possible to easily assemble the sun gear and the key bolt, and to fix and support the sun gear to the key bolt.

The bolt head of the key bolt can be formed to have a trapezoidal cross section, and the carrier shaft of the carrier can have a bolt head insertion groove into which the bolt head is inserted.

According to this configuration, it is possible to easily assemble the key bolt to which the sun gear is assembled to the carrier.

The sun gear can include a first bearing seating portion positioned forward along the axial direction and a second bearing seating portion positioned backward along the axial direction, and the protrusion insertion groove can be formed at a part of the first bearing seating portion.

According to this configuration, the first sun gear bearing seated in the first bearing seating portion can surround the coupling protrusion of the key bolt.

A thickness of the coupling protrusion of the key bolt can be formed smaller than a height of a part of the bolt head protruding in a radial direction from the bolt shaft of the key bolt.

According to this configuration, the forward movement of the first sun gear bearing can be restrained by the bolt head of the key bolt.

A diameter of a front end of the carrier shaft can be formed smaller than a diameter of the back end of the drum shaft, and a diameter of the bolt head of the key bolt can be formed smaller than a diameter of the carrier shaft.

According to this configuration, it is possible to further compact the size of the washing machine driving system.

The front end of the carrier shaft can be inserted into the back end of the drum shaft, and the bolt head of the key bolt can be inserted into a back end of the carrier shaft.

According to this configuration, it is possible to further compact the size of the washing machine driving system.

The washing machine driving system can further comprise a first bearing assembly including a first bearing housing coupled to a tub, and a first bearing accommodated inside the first bearing housing and supporting the drum shaft; and a second bearing assembly including a second bearing housing coupled to the gear housing at a front side of the planetary gear assembly, and a second bearing positioned between the second bearing housing and the first bearing housing, and coupling the planetary gear assembly to the first bearing housing.

The first bearing can include a front side support bearing and a back side support bearing that support the drum shaft, the first bearing assembly can further include a first snap ring coupled to a groove portion positioned at a back side end of the drum shaft at a back side of the back side support bearing, the second bearing assembly can further include a second snap ring coupled to a groove portion positioned at an end of the first bearing housing toward a back side of the second bearing, and the first bearing housing and the second bearing housing each can have a protruding jaw for restraining a forward movement of the second bearing.

According to this configuration, after assembling a drum assembly composed of a drum, a spider, a drum shaft, etc. to the tub, it is possible to couple the first coupling ring to the drum shaft at the back side of the drum, and prevent the drum shaft from being separated from the tub and the first bearing assembly coupled to the tub.

In addition, it is possible to effectively support the drum shaft, and to effectively restrain the forward movement and backward movement of the second bearing.

In addition, it is possible to easily couple the second bearing assembly and the planetary gear assembly to the first bearing housing.

In addition, it is possible to couple the second bearing housing and the planetary gear assembly while holding the second bearing in place.

In the washing machine driving system, the second bearing housing can be coupled to the gear housing by a fastening member, the second bearing housing and the gear housing each can include a fastening member insertion portion into which the fastening member is inserted, and a center line of the fastening member insertion portion of the second bearing housing and a center line of a fastening member insertion portion of the gear housing can be offset from each other.

According to this configuration, when coupling the second bearing housing and the gear housing using the fastening member, the gear housing can press the second bearing forward.

The washing machine driving system, can further comprise a clutch coupled to the gear housing to be slidable toward front side and back side along the axial direction of the drum shaft, and integrally rotating with the gear housing; and a clutch driving portion moving the clutch toward the front side or the back side.

The clutch can include a plurality of coupling protrusions at front side and back side ends, respectively, and the first bearing housing and the rotor frame each can include a protrusion coupling portion coupled to the plurality of coupling protrusions when the clutch moves toward the front side or the back side.

According to the present disclosure, the planetary gear assembly and the clutch can be disposed in the inner space of the stator. Therefore, it is possible to compact the washing machine driving system, and it is possible to secure the volume of the drum to the maximum.

In addition, since the power transmission path can be adjusted by engaging the clutch with the first bearing housing or the rotor frame, the installation space for the clutch can be minimized.

Each of the sun gear, the ring gear, and the plurality of pinion gears can include a helical gear.

According to this configuration, it is possible to increase the safety factor of the gears provided in the planetary gear assembly, and reduce operating noise generated during gear rotation.

The clutch driving portion can include a clutch motor positioned in a direction perpendicular to the axial direction and coupled to the tub; a drawer coupled to the clutch motor and moving in a direction perpendicular to the axial direction by the clutch motor; a lifter including an arm portion in contact with a back side end of the clutch and moving in the axial direction according to the movement of the drawer; and a return spring positioned between the clutch and the gear housing and applying the clutch pressure toward the back side in the axial direction. According to this configuration, since a clutch link structure can be formed by simple linear motion of the drawer in a direction perpendicular to the axial direction within a narrow space between the motor and the planetary gear assembly, it can be possible to minimize the installation space of the clutch driving portion.

The clutch driving portion can further include a holder for supporting the drawer and the lifter. According to this configuration, it can be possible to effectively support the drawer and the lifter.

The drawer and the lifter each can include an inclined portion for moving the lifter in the axial direction according to the movement of the drawer. According to this configuration, it can be possible to effectively transmit the power of the clutch motor to the clutch.

The lifter can include a guide, and a stator can include a guide insert portion into which the guide is inserted. According to this configuration, it can be possible to effectively support the axial movement of the lifter.

The stator or the lifter can include a moment preventing portion for preventing rotational moment from being applied to the guide when the lifter moves in the axial direction. According to this configuration, it can be possible to effectively transmit the power of the clutch motor to the clutch.

The washing machine can include a washing machine driving system having the above configuration. Therefore, it can be possible to maximize the volume of the drum and improve the assembly efficiency.

In some implementations, the drum shaft and the motor are separated, the axial degree of freedom of the drum shaft is restrained, and the planetary gear assembly is disposed between the drum shaft and the motor.

Therefore, it can be possible to prevent the drum shaft from being separated from the bearing housing on the tub side, and form the size of the sun gear provided in the planetary gear assembly regardless of the size of the outer diameter of the drum shaft.

Therefore, since the size of the sun gear can be reduced, it can be possible to compact the planetary gear assembly. In addition, it can be possible to effectively implement a high reduction ratio region while using a small motor. Accordingly, it can be possible to down-size the motor and motor driving circuit.

In some examples, since the volume of the drum can be secured as much as the size of the planetary gear assembly is reduced, it can be possible to maximize the volume of the drum and improve the assembly efficiency.

In some examples, it can be possible to sufficiently secure the axial force for moving the clutch even with a small-sized clutch motor.

In some examples, it can be possible to increase the safety factor of the gears provided in the planetary gear assembly.

In some examples, it can be possible to improve the durability and noise performance of the washing machine driving system and increase the driving efficiency.

In some examples, it can be possible to improve the assembly efficiency of the washing machine driving system.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included as a part of the detailed description to help the understanding of the present disclosure, provide implementations of the present disclosure, and together with the detailed description, describe the technical features of the present disclosure.

DETAILED DESCRIPTION

Figure 1:
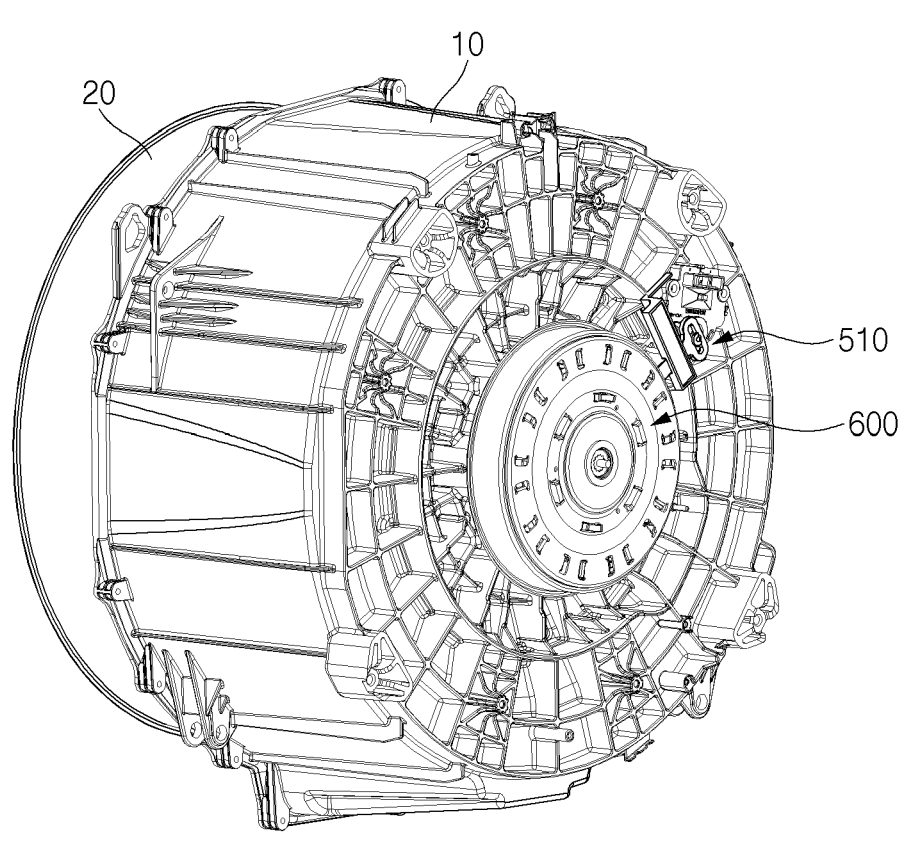
FIG. 1 is a perspective view showing a schematic configuration of an example of a washing machine.

Hereinafter, one or more implementations will be described in detail with reference to the accompanying drawings, however, regardless of the reference numerals, the same or similar elements will be given the same reference numerals and redundant description thereof will be omitted.

The washing machine can include a so-called drum type washing machine. In some implementations, the washing machine can include a so-called full-automatic washing machine, and can be configured to automatically execute a series of washing processes including processes such as washing, rinsing, and spin-drying.

In some implementations, as shown in FIG. 1, a washing machine can include a main body, a tub 10 (e.g., a fixed tank), a drum 20 (e.g., a rotating tank), a washing machine driving system, a controller (e.g., a control device or a processor), and the like.

In some examples, the controller can be composed of hardware such as a central processing unit (CPU) and non-transitory memory, and software such as a control program and various data. The controller can include at least one processor. The processor can be configured to execute program instructions maintained on memory.

The main body of the washing machine is a box-shaped container composed of panels or frames, and can constitute an exterior of the washing machine. A circular inlet for putting in and taking out laundry can be formed on the front of the main body.

A door having a transparent window can be installed in the inlet, and the inlet can be opened and closed by the door.

An operation unit having a switch, etc. operated by a user can be installed on the upper side of the inlet in the main body.

The tub 10 communicating with the inlet can be installed inside the main body. The tub 10 is made of a bottomed cylindrical container capable of storing water, and an opening of the tub 10 can communicate with the inlet.

A water supply device including a water supply pipe, a water supply valve, and a detergent injection unit can be provided at the upper part of the tub 10.

The drum 20 can be formed of a cylindrical container having a diameter slightly smaller than that of the tub 10, and can be accommodated in the tub 10 in a state in which the center line coincides with the tub 10.

The drum 20 can have a circular opening corresponding to the inlet, and laundry can be put into the drum 20 through the inlet and the circular opening. A plurality of dewatering holes can be formed throughout the entire circumference of the drum 20.

A driving system is installed on a back side of the tub 10. Here, the back side can refer to a side where a motor is positioned, and can refer to the right side based on FIGS. 2 and 3. In addition, a front side can refer to a side where the tub 10 is positioned, and can refer to the left side based on FIGS. 2 and 3.

Referring to FIGS. 2 to 6, the driving system can largely include a first bearing assembly 100, a second bearing assembly 200, a planetary gear assembly 300, a clutch 400, a clutch driving portion 500, and a motor 600.

The drum 20 can be fixed to a front side end of a drum shaft 25 protruding through the tub 10. Thus, the drum 20 can be driven in a direct driving manner.

The first bearing assembly 100 can be fixedly supported on the tub 10 toward the back side of the tub 10. The first bearing assembly 100 can include a first bearing housing 110 fixedly supported on the tub 10. The first bearing housing 110 can have an inner space for accommodating the drum shaft 25.

Here, "fixed support" means that the tub 10 and the first bearing assembly 100 are supported in a state in which relative rotation between them is impossible, that is, in a fixed state.

The first bearing assembly 100 can include a first bearing 120 positioned between the drum shaft 25 passing through the inside of the first bearing housing 110 and the first bearing housing 110.

The first bearing 120 can include a front side support bearing 120a and a back side support bearing 120b for rotationally supporting the drum shaft 25.

Here, "rotational support" means that the drum shaft 25 is rotatably supported with respect to the first bearing housing 110.

Therefore, the first bearing 120 can effectively support the drum shaft 25, and the drum shaft 25 can rotate smoothly.

A groove portion 25a can be formed at a back side end of the drum shaft 25, and a first snap ring 130 can be coupled to the groove portion 25a of the drum shaft 25 at the back side of the back side support bearing 120b. The first snap ring 130 can be understood as one of the components of the first bearing assembly 100.

Therefore, when the first snap ring 130 is coupled to the groove portion 25a of the drum shaft 25 after assembling the drum assembly (including the drum and the drum shaft) by moving it from the front side of the tub 10 and the first bearing assembly 100 coupled to the tub 10 toward the back side, the drum shaft 25 of the drum assembly is prevented from moving toward the front and back sides of the tub 10 and the first bearing assembly 100.

If it is possible to prevent axial movement of the drum assembly, it is also possible to use other components instead of the first snap ring 130.

A carrier 310 of the planetary gear assembly 300 can be coupled to the back side end of the drum shaft 25.

The carrier 310 can include a carrier flange 310a positioned inside a gear housing 320 provided in the planetary gear assembly 300, and a carrier shaft 310b extending in an axial direction from the carrier flange 310a and protruding toward the front side of the gear housing 320 and coupled to the drum shaft 25.

Splines or serrations can be provided on an outer circumferential surface of the carrier shaft 310b and an inner circumferential surface of the drum shaft 25, respectively.

That is, the carrier shaft 310b can have a front end inserted into a back end of the drum shaft 25, and thus can be fixedly supported on the drum shaft 25. Here, "fixed support" means that the carrier shaft 310b and the drum shaft 25 are supported in a state in which relative rotation between them is impossible, that is, in a fixed state.

Therefore, the carrier 310, in a state assembled to the drum shaft 25, can rotate integrally with the drum shaft 25.

A diameter of the carrier shaft 310b can be formed smaller than that of the drum shaft 25 so that a front end of the carrier shaft 310b can be inserted into the back end of the drum shaft 25.

For example, a diameter of the front end of the carrier shaft 310b can be formed smaller than a diameter of the back end of the drum shaft 25.

When the diameter of the front end of the carrier shaft 310b is formed smaller than the diameter of the back end of the drum shaft 25, the size of the washing machine driving system, in particular, the size of the planetary gear assembly and the size of the rotor frame can be reduced.

Here, the size of the planetary gear assembly and the size of the rotor frame refer to the size of the planetary gear assembly and the size of the rotor frame as viewed from the back side of the washing machine, in other words, they can be understood as the diameter of the gear housing and the diameter of the rotor frame.

In some implementations, the diameter of the front end of the carrier shaft 310b can be smaller than the diameter of the back end of the drum shaft 25 in order to compact the washing machine driving system.

In some implementations, the diameter of the front end of the carrier shaft 310b can be larger than the diameter of the back end of the drum shaft 25.

In present disclosure, the front end can refer to a front side end, and the front end of the carrier shaft 310b can refer to a part fixedly supported on the drum shaft 25.

In addition, the back end can refer to a back side end, and the back end of the drum shaft 25 can refer to a part for fixing and supporting the carrier shaft 310b.

The front end can be understood as one end, and the back end can be understood as the other end.

When the front end of the carrier shaft 310b is inserted into the back end of the drum shaft 25, and/or a bolt head 360a of a key bolt 360 is inserted into a back end of the carrier shaft 310b, the thickness of the washing machine driving system, that is, the size of the washing machine driving system along the axial direction of the drum shaft 25 can be reduced. Thus, it is possible to more compactly manufacture the washing machine driving system.

The planetary gear assembly 300 can further include a sun gear 330, a ring gear 340, a plurality of pinion gears 350 and the key bolt 360.

The front end of the carrier 310 is coupled to the back end of the drum shaft 25 in the axial direction as described above, and rotates integrally with the drum shaft 25.

A front end of the sun gear 330 is rotationally supported on the carrier 310. Therefore, the front end of the sun gear 330 is spaced apart from the back end of the drum shaft 25 in the axial direction.

Here, "rotational support" means that two different components, for example, the sun gear 330 and the carrier 310, are supported in a state in which they can rotate relative to each other.

In this way, the front end of the sun gear 330 is spaced apart from the back end of the drum shaft 25.

Specifically, the carrier shaft 310b of the carrier 310 is fixedly supported at the back end of the drum shaft 25, and the bolt head 360a of the key bolt 360 is rotationally supported on the carrier shaft 310b, and the sun gear 330 is fixedly supported on the key bolt 360.

Therefore, even if the outer diameter of the drum shaft 25 is large, the size of the sun gear 330, which is related to the reduction ratio of the planetary gear assembly 300, can be formed regardless of the size of the drum shaft 25, so that it is possible to downsize the sun gear 330, and accordingly, it is possible to downsize the planetary gear assembly.

Therefore, it is possible to compact the planetary gear assembly 300, and it is possible to effectively implement a high reduction ratio region while using a small motor.

A back end of the sun gear 330 can protrude toward the back side of the gear housing 320 and can be fixedly supported on a rotor frame 610 of the motor 600. The back end of the sun gear 330 can be fixed to the rotor frame 610 using a nut.

When the sun gear 330 is coupled to the carrier 310 and/or the gear housing 320, the key bolt 360 can be used.

Figure 7:
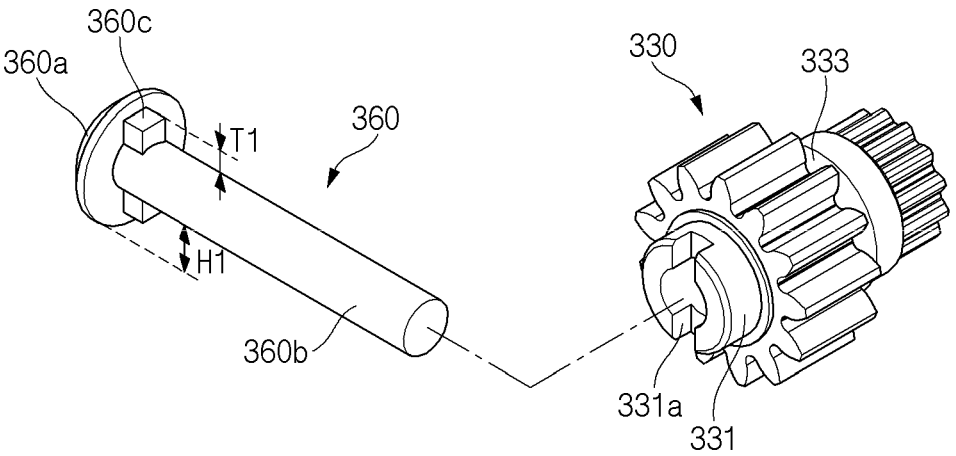
FIG. 7 is a perspective view showing an example of detailed configurations of a key bolt and a sun gear of a planetary gear assembly.
Figure 8:
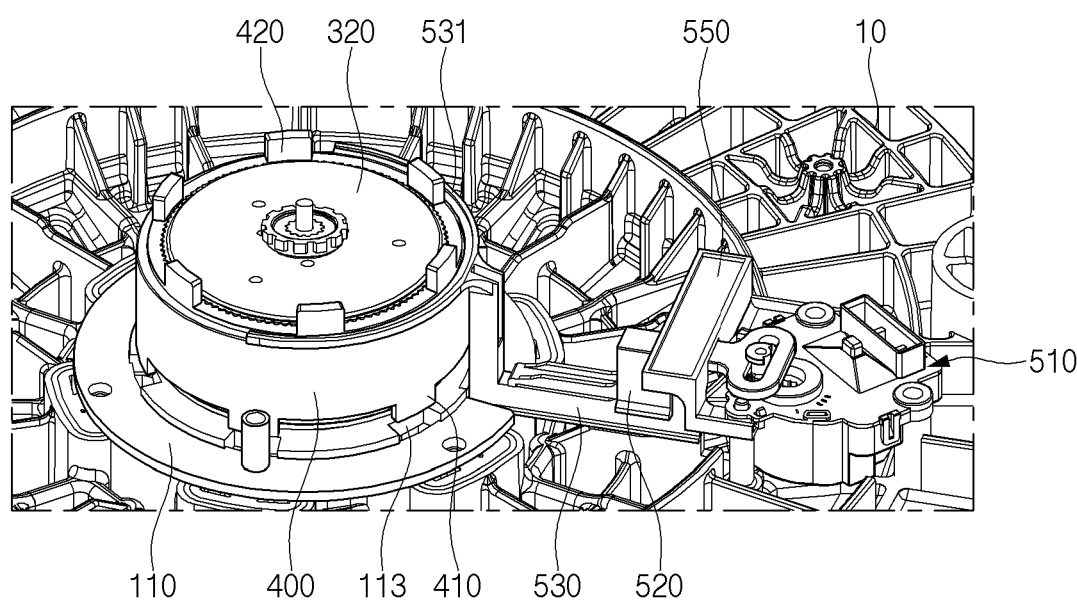
FIG. 8 is a perspective view showing a schematic configuration of an example of a clutch and a clutch driving portion.

Referring to FIG. 7, the key bolt 360 can include a bolt head 360a coupled to the front end of the sun gear 330, a bolt shaft 360b extending backward along the axial direction and penetrating the sun gear 330, and a coupling protrusion 360c protruding backward from the bolt head 360a along the axial direction.

The bolt head 360a is formed to have a substantially trapezoidal cross section. Therefore, when inserting the key bolt 360 into a bolt head insertion groove 310c of the carrier 310, the key bolt 360 can be smoothly inserted.

In some implementations, one or more coupling protrusions 360c can include two or more coupling protrusions, and can be integrally formed with a part of an outer circumferential surface of the bolt shaft 360b.

A thickness T1 of the coupling protrusion 360c can be formed smaller than a height H1 of a part of the bolt head 360a protruding in a radial direction from the bolt shaft 360b.

The sun gear 330 can be fixedly supported on the bolt shaft 360b.

The sun gear 330 can include a first bearing seating portion 331 positioned forward along the axial direction and a second bearing seating portion 333 positioned backward along the axial direction.

Accordingly, the sun gear 330 can be supported by a first sun gear bearing 335 seated on the first bearing seating portion 331 and a second sun gear bearing 337 seated on the second bearing seating portion 333.

The first bearing seating portion 331 can include a protrusion insertion groove 331a into which the coupling protrusion 360c of the key bolt 360 is inserted.

The first sun gear bearing 335 is positioned between the carrier shaft 310b and a front side end of the sun gear 330 to support the sun gear 330, and the second sun gear bearing 337 is positioned between the gear housing 320 and the sun gear 330 to support the sun gear 330.

Since the coupling protrusion 360c of the key bolt 360 is coupled to the protrusion insertion groove 331a of the first bearing seating portion 331, the first sun gear bearing 335 surrounds the coupling protrusion 360c.

Since the thickness T1 of the coupling protrusion 360c is formed smaller than the height H1 of the part of the bolt head 360a protruding in the radial direction from the bolt shaft 360b, a forward movement of the first sun gear bearing 335 can be restrained by the bolt head 360a.

Further, a backward movement of the first sun gear bearing 335 can be restrained by a gear portion of the sun gear 330.

A diameter of the bolt head 360a of the key bolt 360 can be formed smaller than the diameter of the carrier shaft 310b. The bolt head 360a of the key bolt 360 can be inserted into the back end of the carrier shaft 310b.

The bolt head 360a is formed to have a substantially trapezoidal cross section. Accordingly, when inserting the key bolt 360 into the carrier 310, the key bolt 360 can be smoothly inserted.

According to this configuration, since a front side end of the bolt head 360a is inserted into a back side end of the carrier shaft 310b, the size of the washing machine driving system can be formed more compact.

Figure 6:
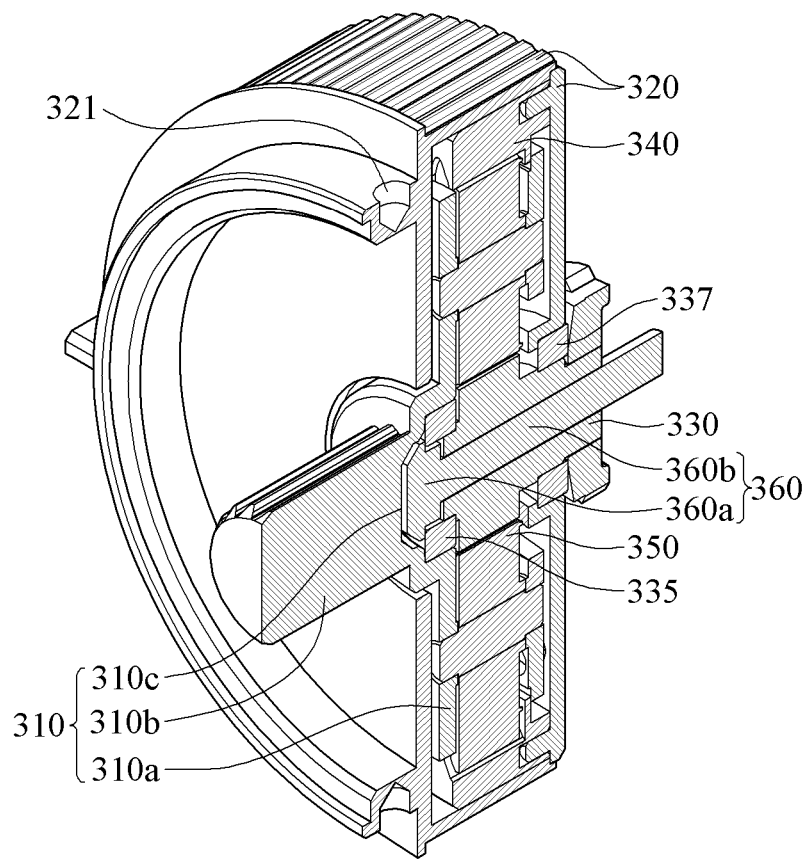
FIG. 6 is a cross-sectional perspective view showing an example of a schematic configuration of a planetary gear assembly.

Referring to FIG. 6, the diameter of the sun gear 330 can be formed larger than the diameter of the bolt head 360a, but can be formed smaller than the diameter of the carrier shaft 310b or can be formed equal to the diameter of the carrier shaft 310b.

In some examples, the diameter of the sun gear 330 can be smaller than the diameter of the drum shaft 25.

When the sun gear 330 is coupled to the carrier 310 and/or the gear housing 320 using the key bolt 360, the motor 600 and the planetary gear assembly 300 can be assembled and separated at the back side of the washing machine, where visibility is easily secured, so it is possible to improve assembly efficiency.

The ring gear 340 can be positioned on an inner wall surface of the gear housing 320, and can be fixedly supported on the gear housing 320.

The plurality of pinion gears 350 can be coupled to the carrier flange 310a.

The plurality of pinion gears 350 coupled to the carrier flange 310a can rotate or revolve depending on whether the carrier flange 310a rotates while being tooth-coupled to the sun gear 330 and the ring gear 340, respectively.

Here, "tooth coupling" refers to a state in which teeth of the gear portion provided in the corresponding gear are engaged with each other and coupled to each other.

For example, in a state in which the carrier flange 310a is fixed, the plurality of pinion gears 350 each can rotate, but may not revolve. In addition, in a state in which the carrier flange 310a rotates, the plurality of pinion gears 350 can revolve, or rotate and revolve.

The gear housing 320 of the planetary gear assembly 300 can be fixedly supported on the first bearing assembly 100 by the second bearing assembly 200.

According to this configuration, the planetary gear assembly 300 is limited in movement in the axial direction. Therefore, if the sun gear 330, the ring gear 340, and the plurality of pinion gears 350 each have a helical gear, the safety factor of the gears provided in the planetary gear assembly 300 can be increased, and the operating noise generated during gear rotation can reduced.

The second bearing assembly 200 can fixedly support the gear housing 320 to the first bearing housing 110.

The second bearing assembly 200 can include a second bearing housing 210 coupled to the gear housing 320 of the planetary gear assembly 300 at the front side of the planetary gear assembly 300 by a fastening member 240 and a second bearing 220 positioned between the second bearing housing 210 and the first bearing housing 110.

The second bearing housing 210 can include a fastening member insertion portion 211 into which the coupling member is inserted, the gear housing 320 can include a fastening member insertion portion 321 into which the fastening member 240 is inserted, and a center line C1 of the fastening member insertion portion 211 of the second bearing housing 210 and a center line C2 of the fastening member insertion portion 321 of the gear housing 320 can be formed to be offset from each other by a predetermined amount D.

According to this configuration, when the second bearing housing 210 and the gear housing 320 are coupled using the fastening member 240, the gear housing 320 can press the second bearing 220 forward.

The second bearing 220 supports the second bearing housing 210 and the gear housing 320 so that the second bearing housing 210 and the gear housing 320 can smoothly rotate with respect to the first bearing housing 110.

A second snap ring 230 can be coupled to a groove 111 positioned at an end of the first bearing housing 110 toward a back side of the second bearing 220.

According to this configuration, the second bearing housing 210 and the planetary gear assembly 300 can be coupled while the second bearing 220 is held in place.

In addition, the second bearing assembly 200 and the planetary gear assembly 300 can be easily coupled to the first bearing housing 110.

The first bearing housing 110 can have a protruding jaw 110a for restraining a forward movement of the second bearing 220, and the second bearing housing 210 can have a protruding jaw 210a for restraining a forward movement of the second bearing 220.

Therefore, the forward movement of the second bearing 220 is limited by the protruding jaws 110a and 210a, and a backward movement of the second bearing 220 is limited by the second snap ring 230.

Figure 9:
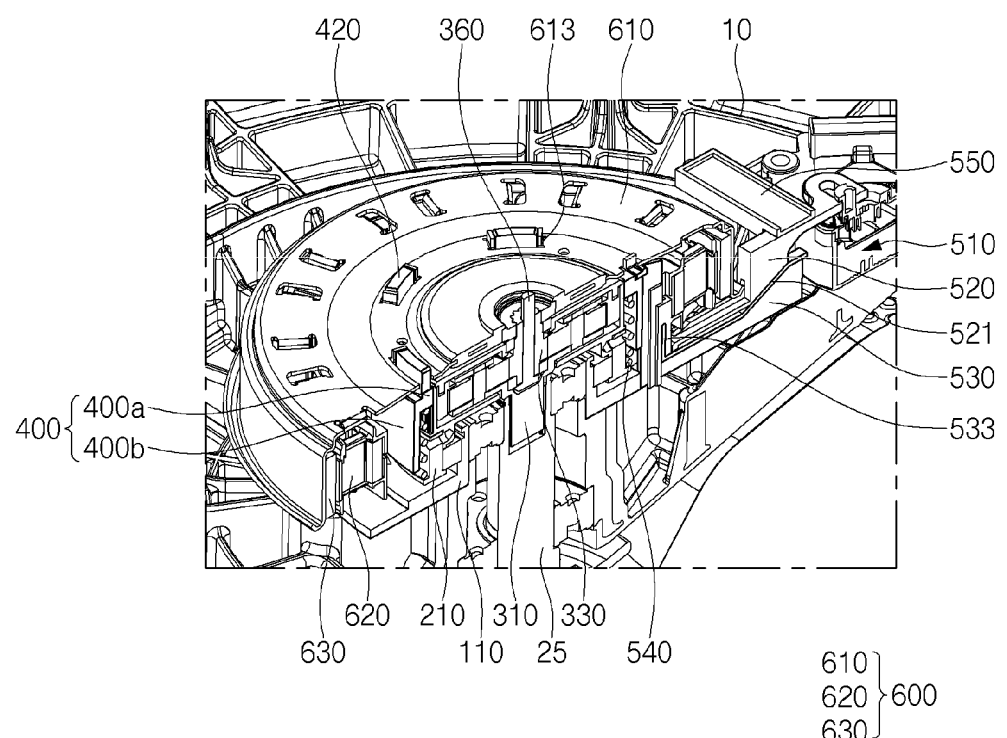
FIG. 9 is a cross-sectional perspective view showing an example of a main part configuration when a washing machine driving system operates in a spin-drying mode.
Figure 10:
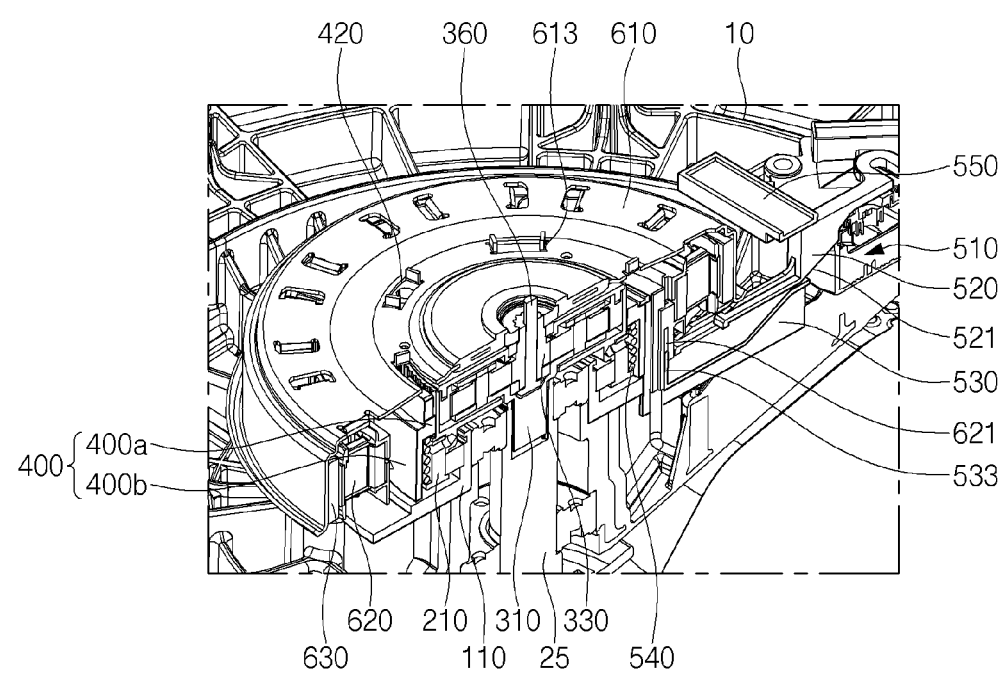
FIG. 10 is a cross-sectional perspective view showing an example of a main part configuration when a washing machine driving system operates in a washing mode.
Figure 11:
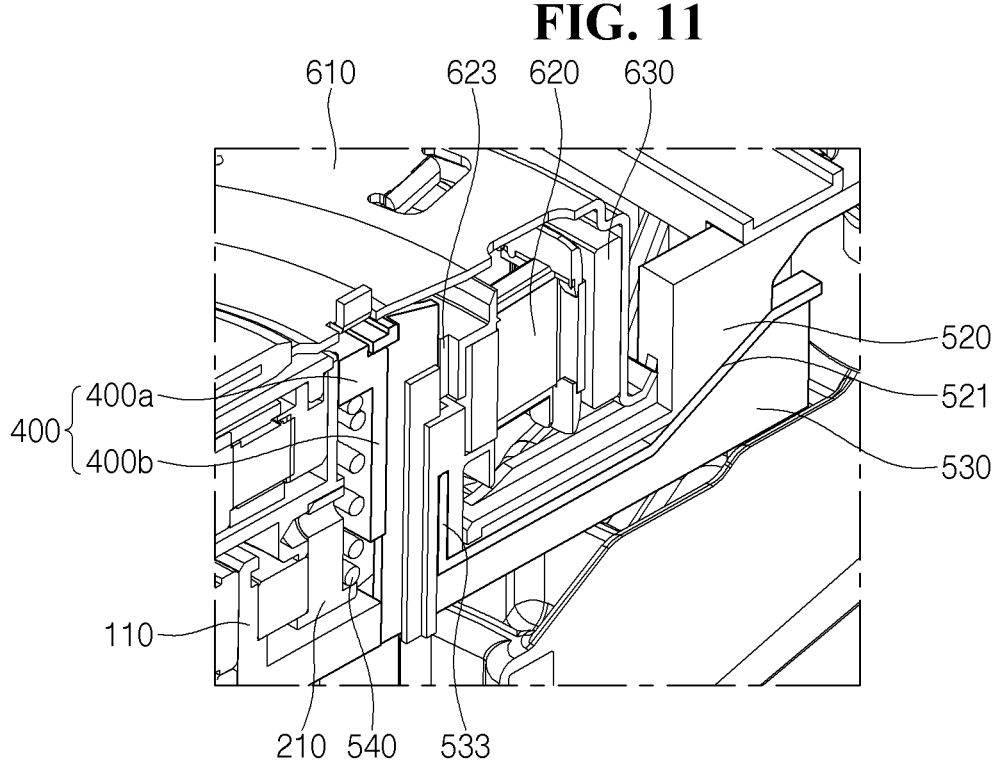
FIG. 11 is a cross-sectional perspective view showing an example of detailed configurations of a clutch and a clutch driving portion.

Referring to FIG. 9, the motor 600 can include the rotor frame 610 to which a back side end of the sun gear 330 is fixedly coupled, a stator 620 positioned in an inner space of the rotor frame 610, and a plurality of permanent magnets 630 positioned inside the rotor frame 610 and rotating the rotor frame 610 by interaction with the stator 620.

Therefore, when the motor 600 operates and the rotor frame 610 rotates, the sun gear 330 fixed to the rotor frame 610 rotates, and the drum shaft rotates according to the rotation of the sun gear 330.

At this time, the drum shaft 25 can rotate at low speed and high torque or at high speed and low torque, which will be described later.

The rotor frame 610 has a space for accommodating the stator 620 and the plurality of permanent magnets 630 therein.

The stator 620 disposed in the inner space of the rotor frame 610 can be fixed to the first bearing housing 110 of the first bearing assembly 100, and has an inner space accommodating the planetary gear assembly 300.

That is, the planetary gear assembly 300, in particular, the gear housing 320 is positioned in the inner space formed by the stator 620.

The clutch 400 for converting a power transmission path through the planetary gear assembly 300 can be positioned in the inner space formed by the stator 620.

That is, the clutch 400 can be coupled to the gear housing 320 to be slidable toward front side and the back side along the axial direction of the drum shaft.

Referring to FIGS. 8 to 11, the clutch 400 is formed of two-stage bodies 400a and 400b having different diameters, and splines or serrations can be provided on an inner circumferential surface of a first body 400a having a relatively smaller diameter than the second body 400b and an outer circumferential surface of the gear housing 320, respectively.

In addition, a return spring 540 of the clutch driving portion 500 is positioned between an inner circumferential surface of a second body 400b having a relatively larger diameter than the first body 400a and the outer surface of the gear housing 320, and between the inner circumferential surface of the second body 400b and the outer circumferential surface of the second bearing housing 210.

Therefore, the clutch 400 can rotate integrally with the gear housing 320, and can move forward and backward along the axial direction.

The clutch 400 can include a plurality of coupling protrusions 410 and 420 at front side end and back side end, respectively.

The coupling protrusion 410 at the front side end can be formed at a front side end of the second body 400b, and the coupling protrusion 420 at the back side end can be formed at a back side end of the first body 400a.

The first bearing housing 110 can include a protrusion coupling portion 113 coupled to the plurality of coupling protrusions 410 when the clutch 400 moves forward along the axial direction, and the rotor frame 610 can include a protrusion coupling portion 613 coupled to the plurality of coupling protrusions 420 when the clutch 400 moves backward along the axial direction.

A method of driving the washing machine having the driving system according to this configuration will be described with reference to FIGS. 2 and 3.

Figure 3:
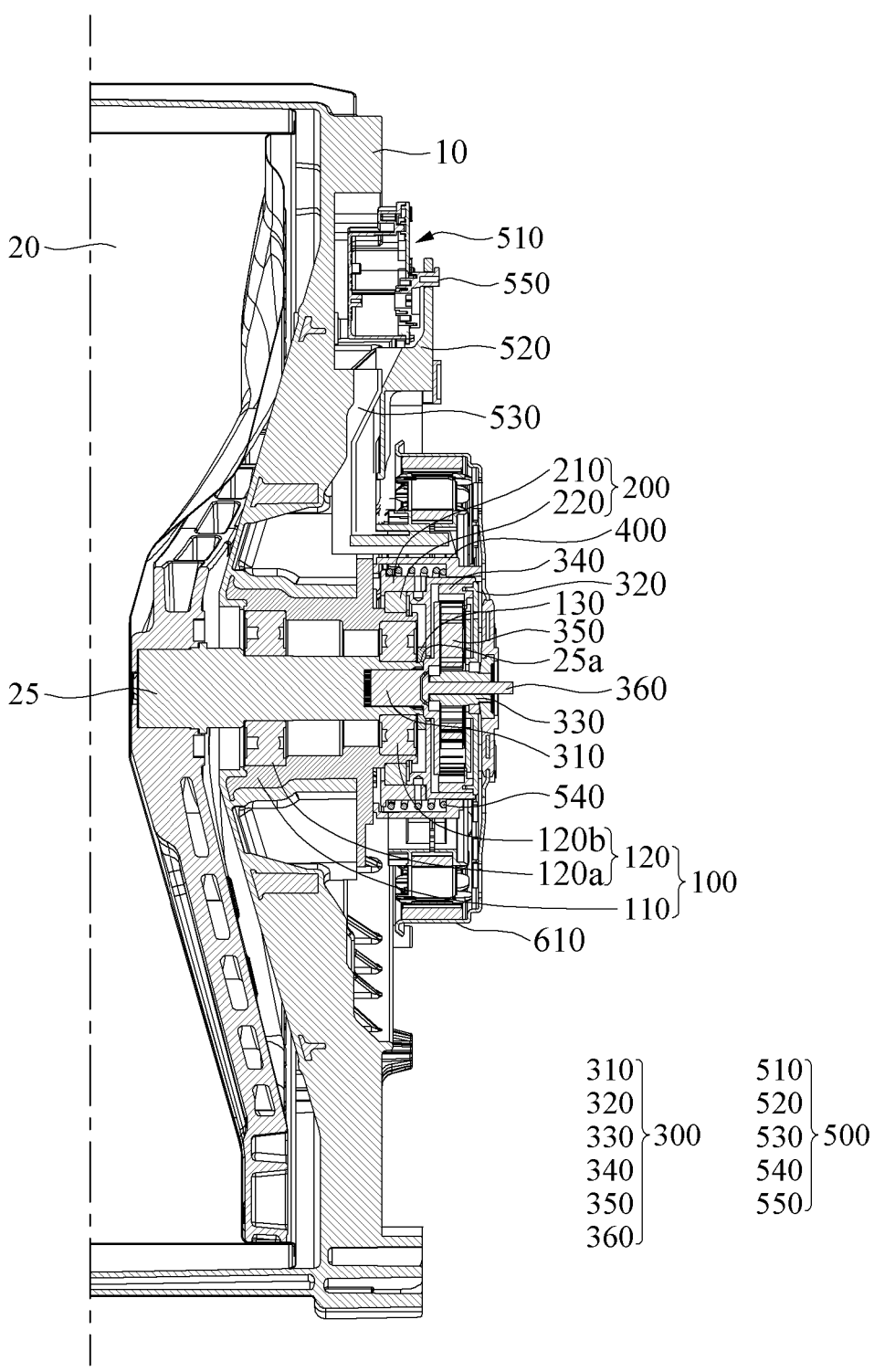
FIG. 3 is a cross-sectional view showing an example of a main part configuration when a washing machine driving system operates in a washing mode.
Figure 4:
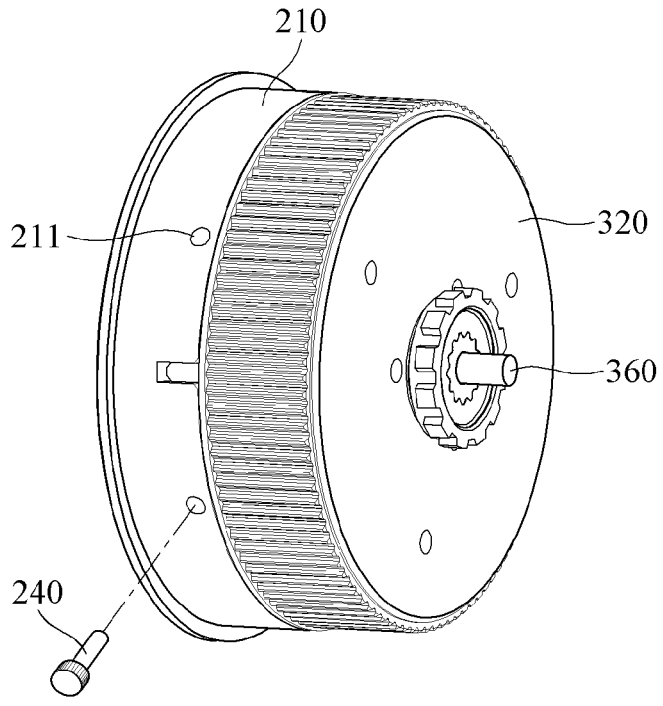
FIG. 4 is a perspective view showing an example of a coupled state of a second bearing housing and a planetary gear assembly.
Figure 5:
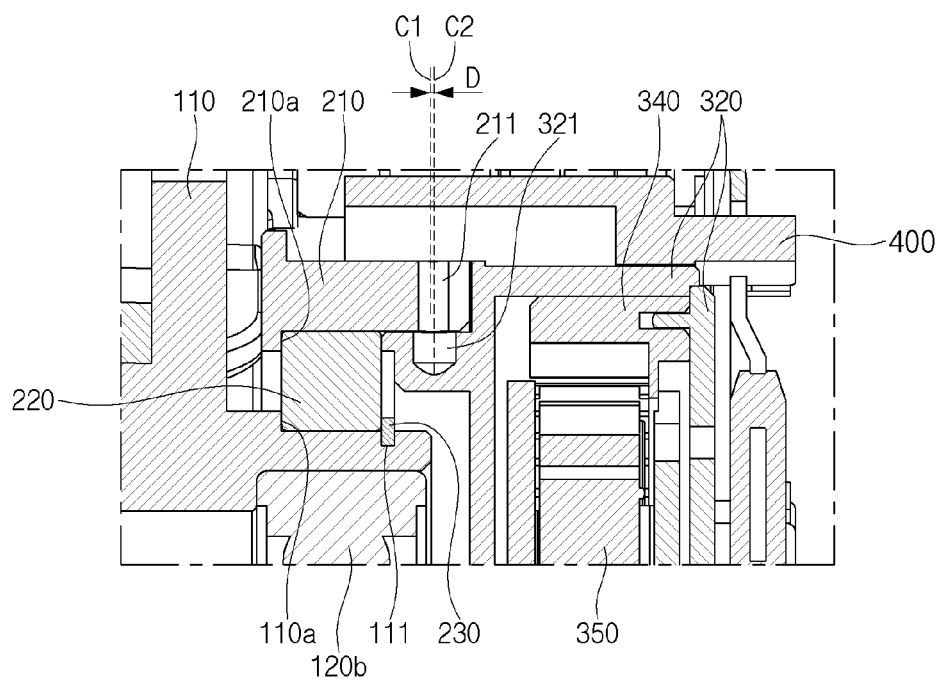
FIG. 5 is a cross-sectional view of main parts showing an example of a coupled state of a second bearing housing and a planetary gear assembly.

When the clutch 400 moves forward and the coupling protrusion 410 at the front side end of the clutch 400 is coupled to the protrusion coupling portion 113 of the first bearing housing 110 as shown in FIG. 3, rotation of the gear housing 320 to which the clutch 400 is coupled is restrained.

That is, since the first bearing housing 110 is fixed to the tub 10, rotations of the first bearing housing 110, the clutch 400 coupled to the first bearing housing 110, and the gear housing 320 coupled to the clutch 400 are restrained.

Therefore, since the ring gear 340 is maintained in a fixed state, while the rotor frame 610 and the sun gear 330 rotate, the plurality of pinion gears 350 revolve around the sun gear 330 while rotating on their own, and the rotational force of the sun gear 330 is transmitted to the drum shaft 25 through the plurality of pinion gears 350 and the carrier 310 so that the drum shaft 25 is driven at low speed and high torque.

Figure 2:
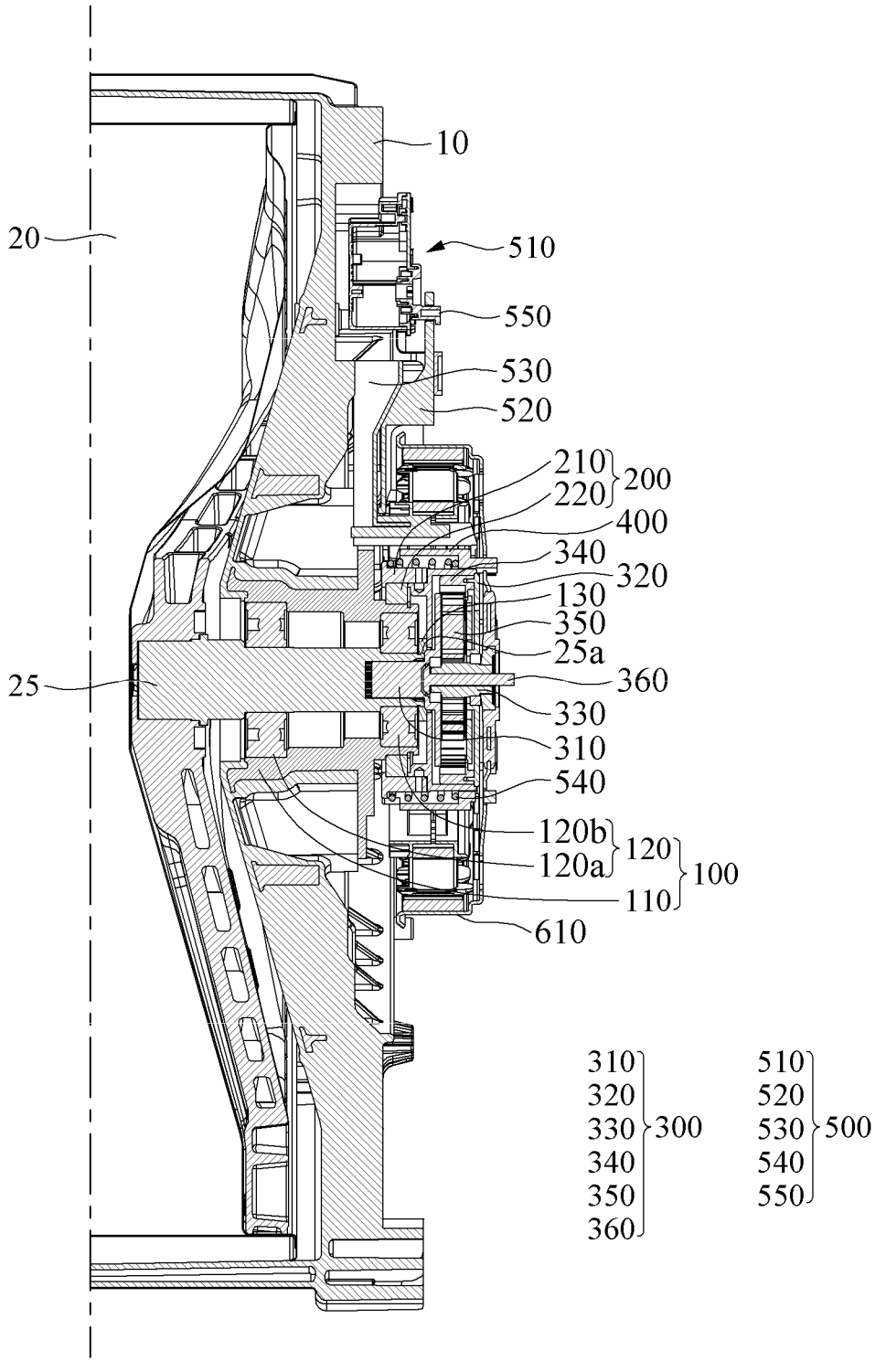
FIG. 2 is a cross-sectional view showing an example of a main part configuration when a washing machine driving system operates in a spin-drying mode.

Then, when the clutch 400 moves to the back side and the coupling protrusion 420 of the clutch 400 is coupled to the protrusion coupling portion 613 of the rotor frame 610 as shown in FIG. 2, the sun gear 330, the clutch 400, and the gear housing 320 to which the clutch 400 is coupled rotate integrally while the rotor frame 610 rotates.

Therefore, since the carrier 310 also rotates integrally with the gear housing 320, the rotational speed of the carrier 310 coincides with the rotational speed of the sun gear 330, and accordingly, the drum shaft 25 is driven at high speed and low torque.

According to this configuration, since the power transmission path can be adjusted by coupling the clutch 400 to the first bearing housing 110 or the rotor frame 610, the clutch 400 can move within a narrow space. Therefore, the installation space of the clutch 400 can be minimized.

Since the planetary gear assembly 300 and the clutch 400 are disposed in the inner space of the stator 620, it is possible to compact the washing machine driving system and secure the maximum volume of the drum 20.

In order to be able to adjust the power transmission path by changing the position of the clutch 400 as described above, the washing machine drive system of the present disclosure further includes the clutch driving portion 500.

The clutch driving portion 500 can include a clutch motor 510, a drawer 520, a lifter 530, and a return spring 540.

The clutch motor 510 can be positioned in a direction perpendicular to the axial direction and can be coupled to the tub 10.

The drawer 520 can be coupled to the clutch motor 510 and can move in the direction perpendicular to the axial direction by the clutch motor 510. When the drawer 520 is moved, a part of the drawer 520 can be positioned between a space between the rotor frame 610 and the tub 10.

The lifter 530 has a C-type arm portion 531 that is in contact with a back side end of the clutch 400. It is also possible to have a ring-type arm portion instead of the C-type arm portion 531, and it is also possible to replace the C-type arm portion with another component capable of pressing the clutch 400 forward.

The lifter 530 can move in the axial direction according to the movement of the drawer 520.

In some examples, the drawer 520 and the lifter 530 each can include an inclined portion 521 to allow the lifter 530 to move in the axial direction according to the movement of the drawer 520.

According to this configuration, it is possible to effectively transmit the power of the clutch motor 510 to the clutch 400.

The return spring 540 can be positioned inside the second body 400b of the clutch 400.

Therefore, the return spring 540 can be positioned between the clutch 400 and the gear housing 320 and between the clutch 400 and the second bearing housing 210, and press the clutch 400 toward the back side in the axial direction.

According to this configuration, since a clutch link structure can be formed by simple linear motion of the drawer 520 in the direction perpendicular to the axial direction within a narrow space between the motor 600 and the planetary gear assembly 300, it is possible to minimize an installation space of the clutch driving portion 500.

The clutch driving portion 500 can further include a holder 550 for supporting the drawer 520 and the lifter 530. According to this configuration, it is possible to effectively support the drawer 520 and the lifter 530 using the holder 550.

The lifter 530 can include a guide 533, and the stator 620 can include a guide insertion portion 621 into which the guide 533 is inserted.

According to this configuration, it is possible to effectively support the axial movement of the lifter 530.

In addition, the stator 620 can include a moment preventing portion 623 for preventing rotational moment from being applied to the guide 533 when the lifter 530 moves in the axial direction.

In the above, it has been described that the moment preventing portion 623 is provided in the stator 620 as an example, but the moment preventing portion can be provided in the lifter 530.

According to this configuration, it is possible to effectively prevent malfunction of the lifter, and it is possible to effectively transmit the power of the clutch motor 510 to the clutch 400.

According to this configuration, when the clutch motor 510 operates to pull the drawer 520 in the deceleration mode, the lifter 530 moves forward along the inclined portion 521 of the drawer 520, and the C-type arm portion 531 of the lifter 530 presses the clutch 400 forward, and accordingly, the return spring 540 mounted inside the clutch 400 in a compressed state is further compressed.

Then, the coupling protrusion 420 of the clutch 400 separates from the protrusion coupling portion 613 of the rotor frame 610 and is separated from each other. Subsequently, when power is applied to the motor 600 to slowly rotate the rotor frame 610, while the coupling protrusion 410 of the clutch 400 is forwardly inserted into the protrusion coupling portion 113 formed on the first bearing housing 110, the rotation of the ring gear 340 is restrained.

In addition, in the direct connection mode, when the clutch motor 510 pushes the drawer 520, the lifter 530 moves rearward along the inclined portion 521 of the drawer 520 and the return spring 540 mounted inside the clutch 400 in a compressed state becomes less compressed.

Then, the coupling protrusion 410 of the clutch 400 separates from the protrusion coupling portion 113 of the first bearing housing 110 and is separated from each other. Subsequently, when power is applied to the motor 600 to slowly rotate the rotor frame 610, the coupling protrusion 420 of the clutch 400 has a rotational degree of freedom while being inserted into the protrusion coupling portion 613 of the rotor frame 610 by the spring force of the return spring 540, and the ring gear 340 has a degree of rotational freedom while being integrated with the rotor frame 610.

The washing machine can maximize the volume of the drum and improve assembly efficiency.

It is apparent to those skilled in the art that the present disclosure can be implemented in other specific forms without departing from the essential characteristics of the present disclosure. Accordingly, the above detailed description should not be construed as restrictive in all respects but should be considered as illustrative. The scope of the present disclosure should be determined by reasonable interpretation of the appended claims, and all changes within the equivalent scope of the present disclosure are included in the scope of the present disclosure.

What is claimed is:

1. A washing machine driving system comprising:
   a motor comprising a rotor frame; and
   a planetary gear assembly comprising:
      a gear housing,
      a carrier comprising (i) a carrier flange disposed inside the gear housing and (ii) a carrier shaft that extends from the carrier flange in an axial direction and protrudes toward a front side of the gear housing, the carrier shaft being connected to a drum shaft and configured to rotate with the drum shaft,
      a sun gear having (i) a front end that is rotatably coupled to the carrier and spaced apart from a back end of the drum shaft and (ii) a back end that protrudes toward a back side of the gear housing and is coupled to the rotor frame, a key bolt that couples the sun gear to the gear housing, the key bolt comprising (i) a bolt head coupled to the front end of the sun gear and (ii) a bolt shaft that extends backward along the axial direction and passes through the sun gear, a plurality of pinion gears coupled to the carrier flange and tooth-coupled to the sun gear, and a ring gear that is tooth-coupled to the plurality of pinion gears, wherein the key bolt further comprises a coupling protrusion that protrudes backward from the bolt head toward the back end of the sun gear along the axial direction, and wherein the sun gear defines a protrusion insertion groove that receives the coupling protrusion of the key bolt.

2. The washing machine driving system of claim 1, wherein the bolt head has a trapezoidal cross section, and wherein the carrier shaft defines a bolt head insertion groove that receives the bolt head.

3. The washing machine driving system of claim 1, wherein the sun gear comprises a first bearing seating portion and a second bearing seating portion, the second bearing seating portion being disposed backward relative to the first bearing seating portion in the axial direction, and wherein the protrusion insertion groove is defined at a part of the first bearing seating portion.

4. The washing machine driving system of claim 3, wherein a thickness of the coupling protrusion is less than a radial distance from the bolt shaft to a part of the bolt head in a radial direction of the bolt shaft.

5. The washing machine driving system of claim 1, wherein a diameter of a front end of the carrier shaft is less than a diameter of the back end of the drum shaft, and wherein a diameter of the bolt head is less than a diameter of a back end of the carrier shaft.

6. The washing machine driving system of claim 5, wherein the front end of the carrier shaft is inserted into the back end of the drum shaft, and wherein the bolt head is inserted into the back end of the carrier shaft.

7. The washing machine driving system of claim 1, further comprising:

a first bearing assembly comprising (i) a first bearing housing that is coupled to a tub of a washing machine and (ii) a first bearing that is accommodated inside the first bearing housing and supports the drum shaft; and a second bearing assembly that couples the gear housing to the first bearing housing, the second bearing assembly comprising (i) a second bearing housing that is coupled to the gear housing and disposed at a front side of the planetary gear assembly and (ii) a second bearing disposed between the second bearing housing and the first bearing housing.

8. The washing machine driving system of claim 7, wherein the first bearing comprises a front side support bearing and a back side support bearing that both support the drum shaft, wherein the first bearing assembly further comprises a first snap ring that is disposed at a back side of the back side support bearing and coupled to a first groove portion that is defined at a back side end of the drum shaft, wherein the second bearing assembly further comprises a second snap ring coupled to a second groove portion that is defined at an end of the first bearing housing and extends toward a back side of the second bearing, and wherein the first bearing housing and the second bearing housing each have a protruding jaw configured to restrict a forward movement of the second bearing toward a front end of the drum shaft.

9. The washing machine driving system of claim 8, wherein the second bearing housing defines a first fastening member insertion portion configured to receive a fastening member for coupling the second bearing housing to the gear housing, wherein the gear housing defines a second fastening member insertion portion configured to receive the fastening member, and wherein a center line of the first fastening member insertion portion and a center line of the second fastening member insertion portion are offset from each other in a radial direction of the fastening member.

10. The washing machine driving system of claim 9, further comprising:

a clutch coupled to the gear housing and configured to move toward a front side and a back side along the axial direction of the drum shaft, the clutch being configured to rotate with the gear housing; and a clutch driving portion configured to move the clutch toward the front side and the back side, wherein the clutch comprises (i) a front coupling protrusion disposed at front side end of the clutch and (ii) a back coupling protrusion disposed at a back side end of the clutch, wherein the first bearing housing defines a front protrusion coupling portion configured to couple to the front coupling protrusion based on the clutch moving toward the front side, and wherein the first bearing housing defines a back protrusion coupling portion configured to couple to the back coupling protrusion based on the clutch moving toward the back side.

11. The washing machine driving system of claim 10, wherein the clutch driving portion comprises:

a clutch motor spaced apart from the clutch in a radial direction of the carrier shaft orthogonal to the axial direction, the clutch motor being coupled to the tub;

a drawer coupled to the clutch motor and configured to move in the radial direction of the carrier shaft by the clutch motor;

a lifter comprising an arm portion in contact with the back side end of the clutch, the lifter being configured to move in the axial direction based on movement of the drawer; and a return spring disposed between the clutch and the gear housing, the return spring being configured to apply pressure to the clutch toward the back side in the axial direction.

12. The washing machine driving system of claim 11, wherein the clutch driving portion further comprises a holder that supports the drawer and the lifter.

13. The washing machine driving system of claim 12, wherein the holder is disposed forward relative to the drawer and disposed between the clutch motor and the drawer in the radial direction of the carrier shaft.

14. The washing machine driving system of claim 11, wherein the drawer and the lifter each comprise an inclined portion configured to move the lifter in the axial direction based on movement of the drawer.

15. The washing machine driving system of claim 11, wherein the lifter comprises a guide, and wherein the motor further comprises a stator, the stator defining a guide insert portion configured to receive the guide.

16. The washing machine driving system of claim 15, wherein the stator or the lifter comprises a moment preventing portion configured to block rotational force from being applied to the guide based on the lifter moving in the axial direction.

17. The washing machine driving system of claim 16, wherein the moment preventing portion comprises a protrusion that protrudes from the stator in the radial direction of the carrier shaft.

18. The washing machine driving system of claim 1, wherein the sun gear, the ring gear, and the plurality of pinion gears each comprise one or more helical gears.

19. A washing machine comprising the washing machine driving system of claim 1.

20. A washing machine driving system comprising:

a motor comprising a rotor frame; and a planetary gear assembly comprising:

a gear housing, a carrier comprising (i) a carrier flange disposed inside the gear housing and (ii) a carrier shaft that extends from the carrier flange in an axial direction and protrudes toward a front side of the gear housing, the carrier shaft being connected to a drum shaft and configured to rotate with the drum shaft, a sun gear having (i) a front end that is rotatably coupled to the carrier and spaced apart from a back end of the drum shaft and (ii) a back end that protrudes toward a back side of the gear housing and is coupled to the rotor frame, a key bolt that couples the sun gear to the gear housing, the key bolt comprising (i) a bolt head coupled to the front end of the sun gear and (ii) a bolt shaft that extends backward along the axial direction and passes through the sun gear, a plurality of pinion gears coupled to the carrier flange and tooth-coupled to the sun gear, and a ring gear that is tooth-coupled to the plurality of pinion gears, wherein a diameter of a front end of the carrier shaft is less than a diameter of the back end of the drum shaft, and wherein a diameter of the bolt head is less than a diameter of a back end of the carrier shaft.

\* \* \* \* \*